United States Patent [19]

Bolton et al.

[11] 4,379,037

[45] * Apr. 5, 1983

[54] REMOVAL OF MANGANESE AND CHLORIDE IONS FROM AQUEOUS ACIDIC ZINC SULPHATE SOLUTIONS

[75] Inventors: Gerald L. Bolton, Fort Saskatchewan; Verner B. Sefton; Nicolaus Zubryckyj, both of Edmonton, all of Canada

[73] Assignee: Sherritt Gordon Mines Limited, Toronto, Canada

[ * ] Notice: The portion of the term of this patent subsequent to Sep. 22, 1998, has been disclaimed.

[21] Appl. No.: 271,723

[22] Filed: Jun. 8, 1981

Related U.S. Application Data

[63] Continuation-in-part of Ser. No. 86,877, Oct. 22, 1979, Pat. No. 4,290,866.

[30] Foreign Application Priority Data

Dec. 20, 1978 [GB] United Kingdom ............... 49207/78

[51] Int. Cl.³ ........................... C25C 1/16; C25B 1/26
[52] U.S. Cl. .................................. 204/119; 204/114; 204/128; 423/50; 423/500

[58] Field of Search .......................... 423/50, 500, 502; 204/114, 119, 128

[56] References Cited

U.S. PATENT DOCUMENTS 2,577,808 12/1951 Pye et al. ............................ 423/502
4,120,941 10/1978 Nowak et al. ....................... 423/500
4,290,866 9/1981 Bolton et al. ....................... 204/119

Primary Examiner—R. L. Andrews
Attorney, Agent, or Firm—Robert F. Delbridge; Arne I. Fors

[57] ABSTRACT

A process for removing manganese and chloride ions from an aqueous acidic sulphate solution containing zinc, manganese and chloride ions without removing a substantial amount of zinc ions from the solution includes adjusting the free acidity of the solution if necessary to at least about 0.1 molar. The solution is then treated with ozone to oxidize manganese ions to manganese dioxide, and the ozone treatment is continued after the manganese concentration has fallen to a low level to oxidize chloride ions to chlorine gas. The precipitated manganese dioxide is removed from the solution.

11 Claims, 2 Drawing Figures

REMOVAL OF MANGANESE AND CHLORIDE IONS FROM AQUEOUS ACIDIC ZINC SULPHATE SOLUTIONS

This is a continuation-in-part of application Ser. No. 086,877 filed Oct. 22, 1979 now U.S. Pat. 4,290,866.

This invention relates to the removal of manganese and chloride ions from aqueous acidic zinc sulphate solutions.

In many processes for the recovery of zinc, zinc containing material such as zinc concentrate is treated to produce an aqueous acidic zinc sulphate solution, and this solution is electrolyzed to produce elemental zinc. Such treatment may include, for example, aqueous acidic oxidation leaching of an unroasted zinc sulphide containing material. Processes of this kind are described in U.S. Pat. Nos. 2,996,440, 3,477,927 and 3,867,268. Other earlier processes include the oxidation roasting of zinc sulphide containing material, followed by aqueous acidic leaching of the resulting oxidic calcine.

For various reasons, the aqueous acidic zinc sulphate solution to be electrolyzed may contain undesirably high concentrations of manganese ions and chloride ions. Manganese and chloride may be present in the zinc containing material and hence may appear as manganese ions and chlorine ions in the aqueous acidic sulphate solution to be leached. This is especially so in processes in which unroasted zinc sulphide material is leached in an aqueous acid oxidation leach. In other processes in which the zinc sulphide material is first subjected to an oxidation roast step to produce an oxidic calcine, some of the chlorine is lost in the roasting step. However, even in such processes, there may be undesirably high concentrations of chloride ions in the subsequent leach solution.

Alternatively, a manganese containing compound or a chlorine containing compound may be used in a treatment step prior to electrolysis. For example, manganese dioxide may be added in the leach step to promote the oxidation of iron in the zinc containing material, and the utilization of this step generally results in the presence of manganese ions in the leach solution. Also, zinc dross may be added in a leach solution purification step and, since commercial zinc dross usually contains chlorine, the utilization of this step will result in chloride ions being present in the solution to be electrolyzed.

Although a relatively low concentration of manganese can be tolerated in the acidic zinc sulphate solution to be electrolyzed and may in fact be beneficial to the electrowinning step, manganese ion concentrations above about 5 g/L are not acceptable. Similarly, the presence of more than a low concentration of chloride ions in the solution and in various process steps after the leach step causes a problem because of the corrosive nature of the chloride ions. For example, it is usually desirable that the chloride ion concentration be less than about 50 mg/L.

U.S. patent application Ser. No. 086,877 filed Oct. 22, 1979 concerns a process for removing manganese ions from an aqueous acidic sulphate solution containing zinc and manganese ions without removing a substantial amount of zinc ions from the solution, the process comprising adjusting the free acidity of the solution to a free acidity of at least about 0.1 molar, treating the solution with ozone to oxidize manganese ions to manganese dioxide, and removing manganese dioxide from the solution.

The present invention is based on the discovery that chloride ions can also be removed in the manganese removal step by continuing the ozone treatment for a sufficient time. It has been found that initially the ozone primarily oxidizes the manganese ions and reacts with the chloride ions when the manganese ion concentration has fallen to a relatively low level. The cloride ions are oxidized to chlorine gas which is emitted from the solution. It is believed that the oxidation of chlorine ions is catalyzed by the presence in the solution of manganic or permanganate ions, that is to say manganese ions in a higher oxidation state than manganous ions.

Accordingly therefore, the present invention provides a process for removing manganese and chloride ions from an aqueous acidic sulphate solution containing zinc, manganese and chloride ions without removing a substantial amount of zinc ions from solution, the process comprising adjusting the free acidity of the solution to at least about 0.1 molar, treating the solution with ozone to oxidize manganese ions to manganese dioxide and continuing the ozone treatment after the manganese concentration has fallen to a low level to oxidize chloride ions to chlorine gas, and removing manganese dioxide from the solution.

Where the solution initially contains from about 100 to about 1000 mg/L chloride ions, the ozone treatment may reduce the chloride concentration to less than about 50 mg/L chloride ions. Alternatively, where the solution initially contains from about 50 to about 1000 mg/L chloride ions, the ozone treatment may reduce the chloride concentration to less than about 10 mg/L chloride ions.

The initial solution will usually contain from about 5 to about 170 g/L zinc ions and from about 1 to about 25 g/L manganese ions. More usually, the initial solution may contain from about 30 to about 60 g/L zinc ions and from about 4 to about 12 g/L manganese ions.

The initial solution preferably has a free acidity of from 0.1 to about 2.5 molar. The ozone treatment is preferably carried out after the electrowinning step where the spent electrolyte usually has a free acidity of from about 0.1 to about 2 molar. The ozone treatment may be carried out on purified leach solution with less free acid and prior to electrolysis, with the free acidity first being raised by the addition of acid so as to have a free acidity in the 0.1 to 2 molar range. The temperature of the solution during ozone treatment is preferably from about 20° to about 60° C.

The ozone treatment is preferably carried out by passing the solution in succession through at least two oxidation cells and passing ozone in succession through the cells in countercurrent flow to the solution flow, the flow of ozone being sufficient to oxidize a sufficient amount of manganese ions before the final cell such that the ozone oxidizes a sufficient time amount of chloride ions in the final cell to reduce the chloride concentration in the solution leaving the final cell to a predetermined value.

A preferred embodiment of the present invention will now be described, by way of example, with reference to the accompanying drawings, of which:

Figure 1:
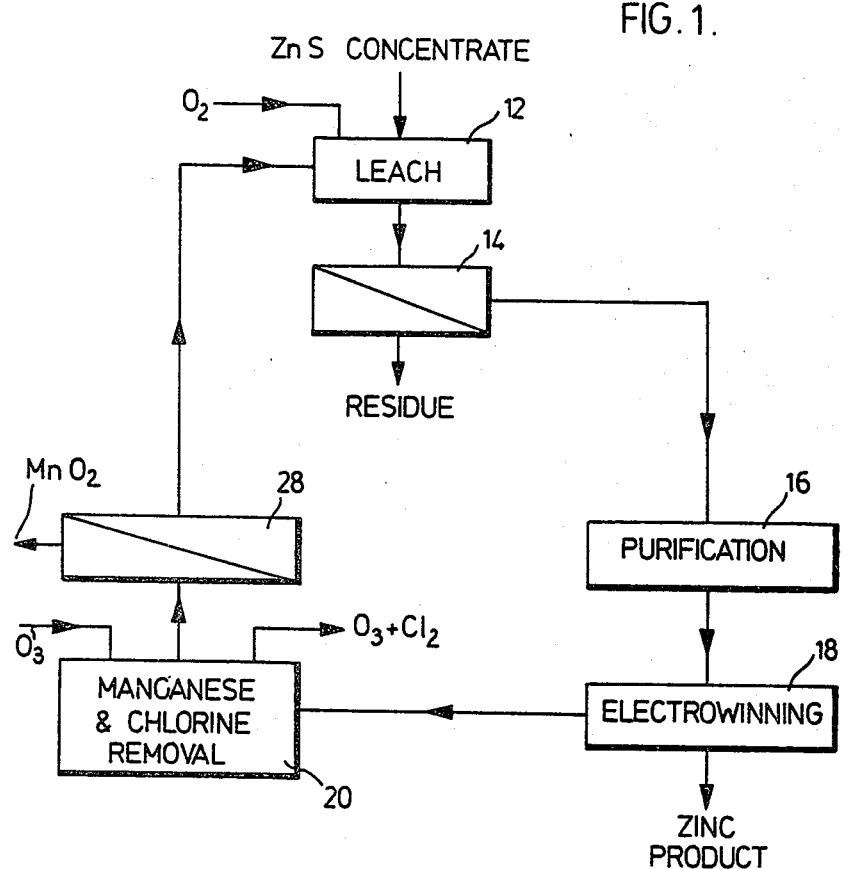
FIG. 1 is a flow diagram of zinc extraction process.

Referring to the drawing, zinc sulphide concentrate which also contains manganese and chlorine is supplied, after suitable pre-treatment such as grinding, to an acid oxidation pressure leach step 12 in which the leaching medium is aqueous sulphuric acid solution, for example as described in U.S. Pat. No. 3,867,268, so that the following primary reaction takes place:

$$ZnS + H_2SO_4 + \tfrac{1}{2}O_2 \rightarrow ZnSO_4 + S \downarrow + H_2O$$

Some manganese and chlorine are also dissolved in this leach step as well as zinc and hence the leach solution contains manganese and chloride ions as well as zinc ions.

The products of the leach step 12 are then subjected to a liquid/solids separation step 14, from which the residue is discarded or treated for the recovery of contained values, the product solution then being subjected to any necessary purification step 16, the nature of which will be clear to a person skilled in the art. The solution is then passed to an electrowinning step 18 where zinc is deposited on the cathode. Zinc is removed from the cathode from time to time as zinc product, and the spent electrolyte is then treated with ozone in manganese and chloride removal step 20.

Figure 2:
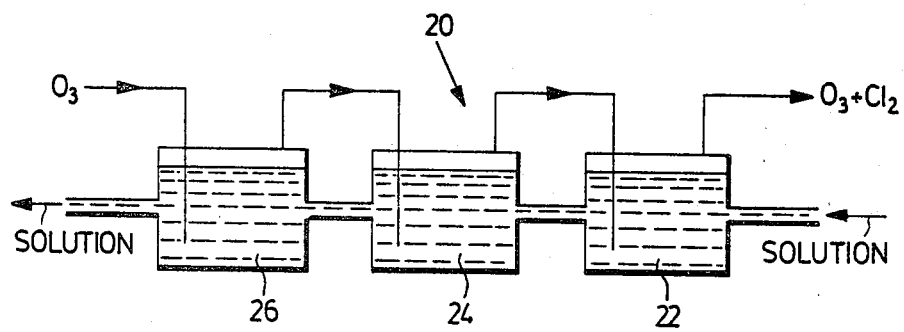
FIG. 2 shows the manganese and chlorine removal step of the process of FIG. 1 in more detail.

As shown in FIG. 2, the manganese and chloride removal step 20 includes three oxidation cells 22, 24 and 26 through which the solution is passed in succession. Ozonized oxygen is passed in succession through the cells 26, 24, 22 in countercurrent flow to the solution flow.

An appreciable amount of manganese ions are oxidized to manganese dioxide in the first cell 22 and a greater amount of manganese ions are oxidized to manganese dioxide in the second cell 24, with a relatively small amount of manganese ions being oxidized to manganese dioxide in the third cell 26. A very small amount of chloride ions are oxidized in the first cell 22 and a slightly greater amount of chloride ions are oxidized in the second cell 24. However, a substantial amount of chloride ions are oxidized in the third cell 26 where the manganese ion concentration is at a low value.

The oxidized chloride ions are released from the solution as chlorine gas. The manganese dioxide is entrained in the solution and flows out of cell 26 to a liquid/solids separation step 28 where the manganese dioxide is separated from the solution. The remaining solution is then recycled to the leach step 12.

Although the liberated chlorine gas consequently passes with the ozone flow through the second and first cells 24, 22, it has been found that there is no significant absorption of chlorine gas by the solution in these cells. The unused ozone which has passed through the cells may be recycled, with the chlorine contained therein being removed in some suitable manner, for example by passage through a sulphite solution.

In a specific example of the preferred embodiment of the invention described above, 1.5 L/min of ozonized oxygen containing 57.5 mg/L ozone was passed sequentially through the three cells countercurrently to a solution passed through the cells at a rate of 15 mL/min, the solution and the gas being at a temperature of about 23° C. The solution contained 150 g/L sulphuric acid, 50 g/L zinc ions, 3.74 g/L manganese ions and 107 mg/L chloride ions. The solution thus had a free acidity of about 1.3 molar.

The manganese and chloride ion concentrations in the first cell 22 stabilized at 2.5 g/L manganese (33% removal) and 106 mg/L chloride (less than 1% removal). The second cell stabilized at 0.7 g/L manganese (81% removal) and 80 mg/L chloride (25% removal). The third cell 26 stabilized at 0.03 g/L manganese (more than 99% removal) and 3 mg/L chloride (97% removal).

It will be noted that there was no significant removal of chloride ions in the first cell 22, neither was chlorine gas in the gas passing through the first cell 22 absorbed by the solution therein.

The preferred embodiment concerns the extraction of zinc from zinc sulphidic material which also contains manganese and chlorine. As indicated earlier, the invention is equally applicable to situations where manganese has been introduced into the process by the use of manganese dioxide during the leach step 12 and/or where chloride ion has been introduced into the process by the use of zinc dross contaminated with chlorine during the purification step 16.

Other embodiments and examples of the invention will be readily apparent to a person skilled in the art, the scope of the invention being defined in the appended claims.

What we claim as new and desire to protect by Letters Patent of the United States is:

1. A process for removing manganese and chloride ions from an aqueous acidic sulphate solution containing zinc, manganese and chloride ions without removing a substantial amount of zinc ions from the solution, said solution having a free acidity of at least about 0.1 molar, the process comprising treating the solution with ozone to oxidize manganese ions to manganese dioxide, continuing the ozone treatment after the manganese concentration has fallen to a low level to oxidize chloride ions to chlorine gas and removing manganese dioxide from the solution.

2. A process according to claim 1 wherein, before ozone treatment, the solution contains from about 100 to about 1000 mg/L chloride ions, and after the ozone treatment the solution contains less than about 50 mg/L chloride ions.

3. A process according to claim 2 wherein, before the ozone treatment, the solution contains from about 50 to about 1000 mg/L chloride ions, and after the ozone treatment the solution contains less than about 10 mg/L chloride ions.

4. A process according to claim 1 wherein the aqueous acidic sulphate solution has a free acidity of from about 0.1 to about 2.5 molar.

5. A process according to claim 1 wherein, before ozone treatment, the solution contains from about 5 to about 170 mg/L zinc ions, and from about 1 to about 25 g/L manganese ions.

6. A process according to claim 1 wherein, before ozone treatment, the solution contains from about 30 to about 60 g/L zinc ions, and from about 4 to about 12 g/L manganese ions.

7. A process according to claim 1 wherein the temperature of the solution during ozone treatment is from about 20° to about 60° C.

8. A process according to claim 1 wherein the aqueous acidic sulphate solution is passed in succession through at least two oxidation cells and ozone is passed in succession through the cells in countercurrent flow to the solution flow, the flow of ozone being sufficient to oxidize a sufficient amount of manganese ions before the final cell such that the ozone oxidizes a sufficient amount of chloride ions in the final cell to reduce the chloride ion concentration in the solution leaving the final cell to a predetermined low value.

9. A process for recovering zinc from zinc containing material which also contains manganese and chloride, comprising leaching the material in an aqueous sulphuric acid solution to produce an aqueous acidic sulphate solution containing dissolved zinc and manganese and chloride, electrolyzing the solution to produce elemental zinc at a cathode and a zinc-depleted manganese and chloride containing acidic sulphate solution, ensuring that the free acidity of the zinc-depleted, manganese and chloride containing solution is at least about 0.1 molar, treating the zinc-depleted, manganese and chloride containing solution with ozone to oxidize manganese ions to manganese dioxide and continuing the ozone treatment after the manganese concentration has fallen to a low level to oxidize chloride ions to chlorine gas without removing a substantial amount of zinc ions, and removing manganese dioxide from solution.

10. A process for recovering zinc from zinc-containing material which also contains manganese, comprising leaching the material in an aqueous sulphuric acid solution to produce an aqueous acidic sulphate solution containing dissolved zinc and manganese, treating the solution in a step including the use of a chlorine containing compound which results in chloride ions being transferred to the solution, electrolyzing the solution to produce elemental zinc at a cathode and zinc-depleted, manganese and chlorine containing acidic sulphate solution, ensuring that the free acidity of the zinc-depleted, manganese and chlorine containing solution is at least about 0.1 molar, treating the zinc-depleted, manganese and chloride containing solution with ozone to oxidize manganese ions to manganese dioxide and continuing the ozone treatment after the manganese concentration has fallen to a low level to oxidize chloride ions to chlorine gas without removing a substantial amount of zinc ions, and removing manganese dioxide from solution.

11. A process for recovering zinc from zinc and chlorine containing material, comprising leaching the material in an aqueous sulphuric acid solution to produce an aqueous acidic sulphate solution containing dissolved zinc and chloride, said leaching step including the addition of a manganese containing compound such that the acidic sulphate solution also contains dissolved manganese, electrolyzing the solution to produce elemental zinc at a cathode and a zinc-depleted, manganese and chloride containing acid sulphate solution, ensuring that the free acidity of the zinc-depleted, manganese and chloride containing solution is at least about 0.1 molar, treating the zinc-depleted, manganese and chloride containing solution with ozone to oxidize manganese ions to manganese dioxide and continuing the ozone treatment after the manganese concentration has fallen to a low level to oxidize chloride ions to chlorine gas without removing a substantial amount of zinc ions, and removing manganese dioxide from solution.

* * * * *